US012712732B2

(12) United States Patent
Debois et al.

(10) Patent No.: US 12,712,732 B2
(45) Date of Patent: Aug. 18, 2026

(54) METHOD FOR AUTHENTICATION OF A SERVICE PROVIDER DEVICE TO A USER DEVICE

(71) Applicant: THALES DIS FRANCE SAS, Meudon (FR)

(72) Inventors: Georges Debois, Paris (FR); Gérald Maunier, Sanary sur Mer (FR); Mourad Faher, Marly le Roi (FR)

(73) Assignee: THALES DIS FRANCE SAS, Meudon (FR)

( * ) Notice: Subject to any disclaimer, the term of this patent is extended or adjusted under 35 U.S.C. 154(b) by 351 days.

(21) Appl. No.: 18/558,568

(22) PCT Filed: May 10, 2022

(86) PCT No.: PCT/EP2022/062670
§ 371 (c)(1),
(2) Date: Nov. 2, 2023

(87) PCT Pub. No.: WO2022/238423
PCT Pub. Date: Nov. 17, 2022

(65) Prior Publication Data

US 2024/0223370 A1 Jul. 4, 2024

(30) Foreign Application Priority Data

May 10, 2021 (EP) .................................... 21305598

(51) Int. Cl.
*H04L 9/32* (2006.01)
*G06F 21/44* (2013.01)

(52) U.S. Cl.
CPC .............. *H04L 9/321* (2013.01); *G06F 21/44* (2013.01); *H04L 9/3263* (2013.01)

(58) Field of Classification Search
CPC ... H04L 9/321; H04L 9/3263; H04L 63/0853; H04L 9/3234; H04L 9/3247;
(Continued)

(56) References Cited

U.S. PATENT DOCUMENTS

| | | | | |
|---|---|---|---|---|
| 10,425,401 | B1 | 9/2019 | Pecen et al. | |
| 2022/0173915 | A1* | 6/2022 | Gray | H04L 9/0852 |

OTHER PUBLICATIONS

International Search Report (PCT/ISA/210) and Written Opinion (PCT/ISA/237) mailed on Aug. 9, 2022, by the European Patent Office as the International Searching Authority for current International Application No. PCT/EP2022/062670—[16 pages].

(Continued)

*Primary Examiner* — Bryan F Wright

(57) ABSTRACT

Provided is a method for post-quantum resistant authentication of a service provider device to a user device, using a legacy certificate of said service provider device and a quantum safe cryptography (QSC) certificate of said service provider device. The method includes verifying by a trusted third party device, using said identifier of the legacy certificate comprised in the QSC certificate, a binding of said QSC certificate to the legacy certificate of the service provider device, and verifying a validity of said QSC certificate by said trusted third party device. The binding and validity have been successfully verified by the trusted third party device, authentication of the service provider device to said user device, using said legacy certificate of the service provider device from which can be obtained said identifier comprised in the QSC certificate whose validity has been verified.

15 Claims, 8 Drawing Sheets

(58) Field of Classification Search
CPC ..... H04L 9/3268; H04L 9/40; H04L 63/0823; H04L 63/0884; G06F 21/44
USPC .......................................................... 713/168
See application file for complete search history.

(56) References Cited

OTHER PUBLICATIONS

Vogt Sebastian et al: "How Quantum Computers threat security of PKIs and thus eIDs", Modersheim (Hrsg.): Open Identity Summit, Jun. 2, 2021 (Jun. 2, 2021), pp. 1-12, XP055854062, Retrieved from the Internet: URL:https://dl.gi.de/bitstream/handle/20.5 00.12116/36504/proceedings-07.pdf?sequence=l&isAllowed=y; [retrieved on Oct. 22, 2021] paragraph [0003]-paragraph [0005].
Dimitrios Sikeridis et al: "Post-Quantum Authentication in TLS 1.3: A Performance Study", IACR, International Association for Cryptologic Research; vol. 20200226:220833; Feb. 26, 2020 (Feb. 26, 2020), pp. 1-16, XP061035392, Retrieved from the Internet: URL:http://eprint.iacr.org/2020/071.pdf; [retrieved on Feb. 26, 2020]; paragraph [000I]-paragraph [00IV].
Christian Paquin et al: "Benchmarking Post-Quantum Cryptography in TLS", IACR, International Association for Cryptologic Research; vol. 20191212:202959; Dec. 12, 2019 (Dec. 12, 2019), pp. 1-17, XP061033940, Retrieved from the Internet: URL:http://eprint.iacr.org/2019/1447.pdf; [retrieved on Dec. 12, 2019] paragraphs [0002], [0004].
Paul Sebastian et al: "Towards Post-Quantum Security for Cyber-Physical Systems: Integrating PQC into Industrial M2M Communication", Sep. 13, 2020 (Sep. 13, 2020), Advances in Intelligent Data Analysis XIX; [Lecture Notes in Computer Science; Lect. Notes Computer], Springer International Publishing, Cham, pp. 295-316, XP047561597, ISSN: 0302-9743; ISBN: 978-3-540-35470-3; [retrieved on Sep. 13, 2020]; paragraphs [0002], [0004].
"CYBER; Migration strategies and recommendations to Quantum Safe schemes", ETSI Technical Report, European Telecommunications Standards Institute (ETSI), 650, Route Des Lucioles; F-06921 Sophia-Antipolis; France; vol. CYBER QSC, No. VI.1.1; Jul. 21, 2020 (Jul. 21, 2020), pp. 1-21, XP014378923, Retrieved from the Internet: URL:http://www.etsi.org/deliver/etsi_tr/10; 3600_103699/103619/01.01.01_60/tr_103619v010101p.pdf; [retrieved on Jul. 21, 2020]; paragraph [0004]-paragraph [0005].
Buchmann Nicolas: "Strengthening trust in the identity life cycle Enhancing electronic machine readable travel documents due to advances in security protocols and infrastructure", Aug. 1, 2018 (Aug. 1, 2018), pp. 1-192, XP055854056, Retrieved from the Internet: URL:https://refubium.fu-berlin.de/bitstream/handle/fubISS/24055/Dissertation_Buchman; n.pdf?sequence=l&isAllowed=y; [retrieved on Oct. 22, 2021]; paragraph [0009].

* cited by examiner

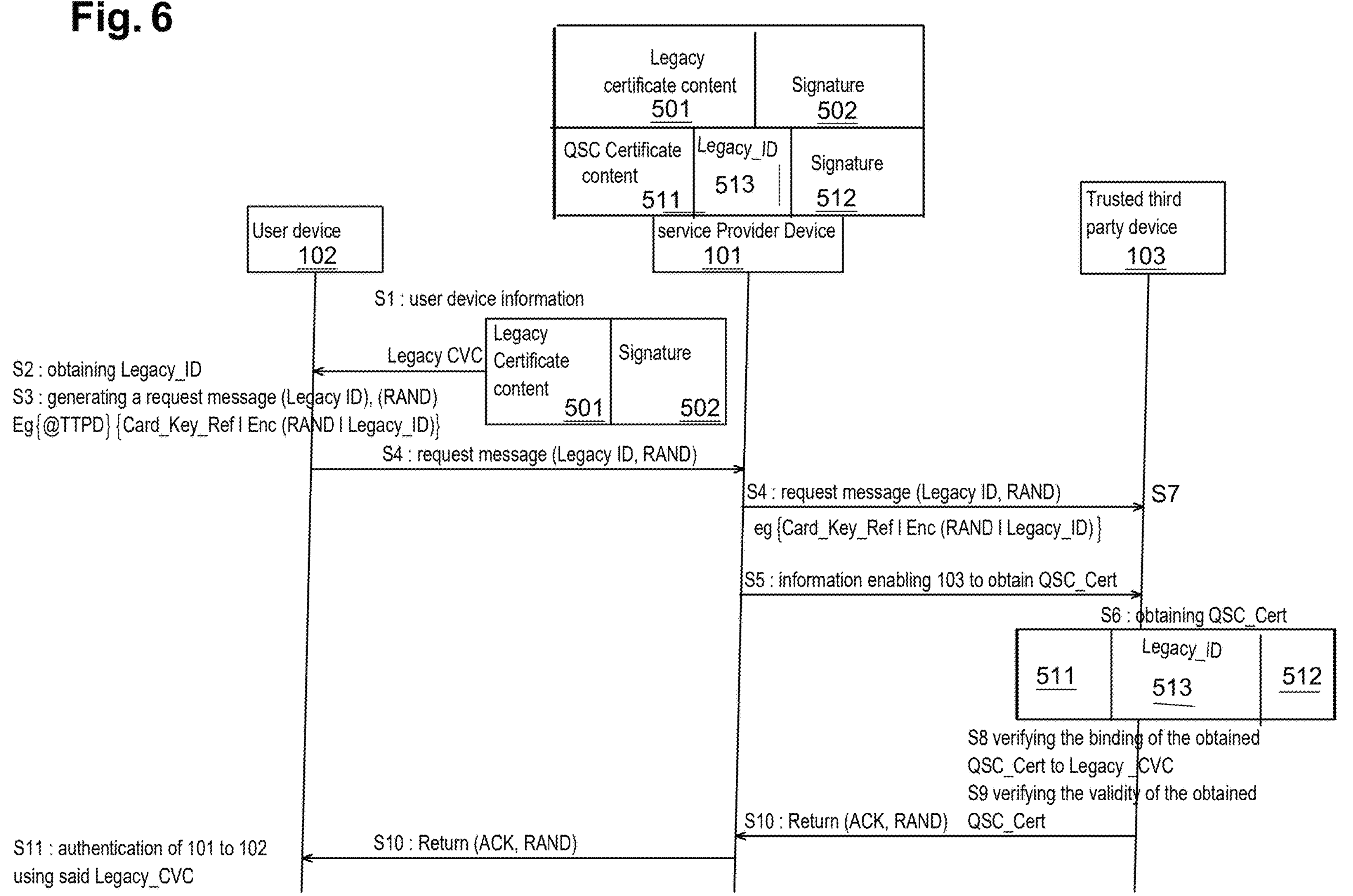
Fig. 6
Legacy certificate content 501
Signature 502
QSC Certificate content 511
Legacy_ID 513
Signature 512
User device 102
service Provider Device 101
Trusted third party device 103
S1 : user device information
Legacy CVC
Legacy Certificate content 501
Signature 502
S2 : obtaining Legacy_ID
S3 : generating a request message (Legacy ID), (RAND)
Eg{@TTPD} {Card_Key_Ref I Enc (RAND I Legacy_ID)}
S4 : request message (Legacy ID, RAND)
S4 : request message (Legacy ID, RAND)
S7
eg {Card_Key_Ref I Enc (RAND I Legacy_ID)}
S5 : information enabling 103 to obtain QSC_Cert
S6 : obtaining QSC_Cert
511
Legacy_ID 513
512
S8 verifying the binding of the obtained QSC_Cert to Legacy_CVC
S9 verifying the validity of the obtained QSC_Cert
S10 : Return (ACK, RAND)
S10 : Return (ACK, RAND)
S11 : authentication of 101 to 102 using said Legacy_CVC

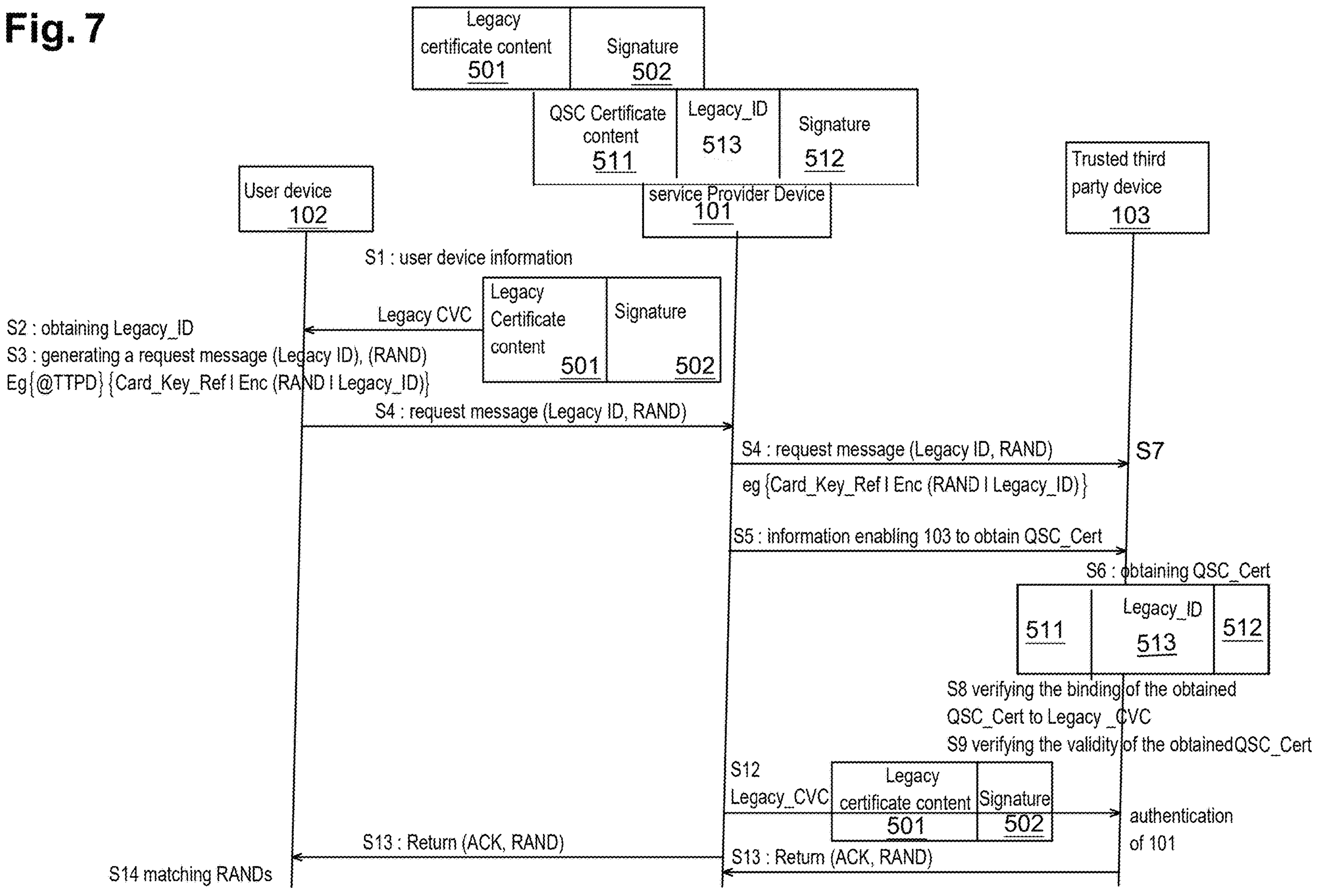
Fig. 7
Legacy
certificate content
501
Signature
502
QSC Certificate
content
511
Legacy_ID
513
Signature
512
User device
102
service Provider Device
101
Trusted third
party device
103
S1 : user device information
Legacy CVC
Legacy
Certificate
content
501
Signature
502
S2 : obtaining Legacy_ID
S3 : generating a request message (Legacy ID), (RAND)
Eg{@TTPD}{Card_Key_Ref I Enc (RAND I Legacy_ID)}
S4 : request message (Legacy ID, RAND)
S4 : request message (Legacy ID, RAND)
S7
eg{Card_Key_Ref I Enc (RAND I Legacy_ID)}
S5 : information enabling 103 to obtain QSC_Cert
S6 : obtaining QSC_Cert
511
Legacy_ID
513
512
S8 verifying the binding of the obtained
QSC_Cert to Legacy _CVC
S9 verifying the validity of the obtainedQSC_Cert
S12
Legacy_CVC
Legacy
certificate content
501
Signature
502
authentication
of 101
S13 : Return (ACK, RAND)
S13 : Return (ACK, RAND)
S14 matching RANDs

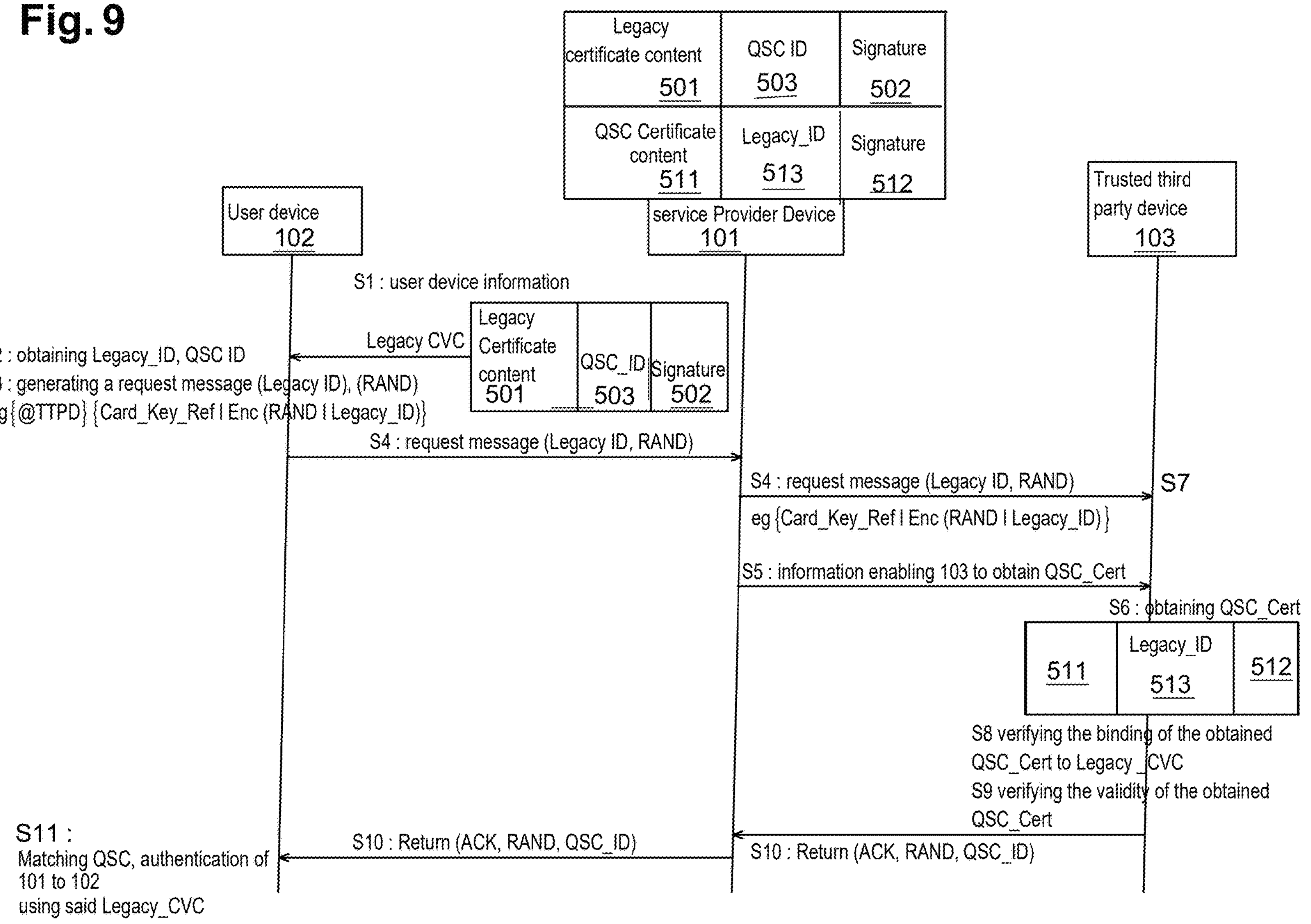
Fig. 9
Legacy certificate content
501
QSC ID
503
Signature
502
QSC Certificate content
511
Legacy_ID
513
Signature
512
User device
102
service Provider Device
101
Trusted third party device
103
S1 : user device information
Legacy CVC
Legacy Certificate content
501
QSC_ID
503
Signature
502
S2 : obtaining Legacy_ID, QSC ID
S3 : generating a request message (Legacy ID), (RAND)
Eg{@TTPD} {Card_Key_Ref I Enc (RAND I Legacy_ID)}
S4 : request message (Legacy ID, RAND)
S4 : request message (Legacy ID, RAND)
S7
eg{Card_Key_Ref I Enc (RAND I Legacy_ID)}
S5 : information enabling 103 to obtain QSC_Cert
S6 : obtaining QSC_Cert
511
Legacy_ID
513
512
S8 verifying the binding of the obtained QSC_Cert to Legacy_CVC
S9 verifying the validity of the obtained QSC_Cert
S11 :
Matching QSC, authentication of 101 to 102
using said Legacy_CVC
S10 : Return (ACK, RAND, QSC_ID)
S10 : Return (ACK, RAND, QSC_ID)

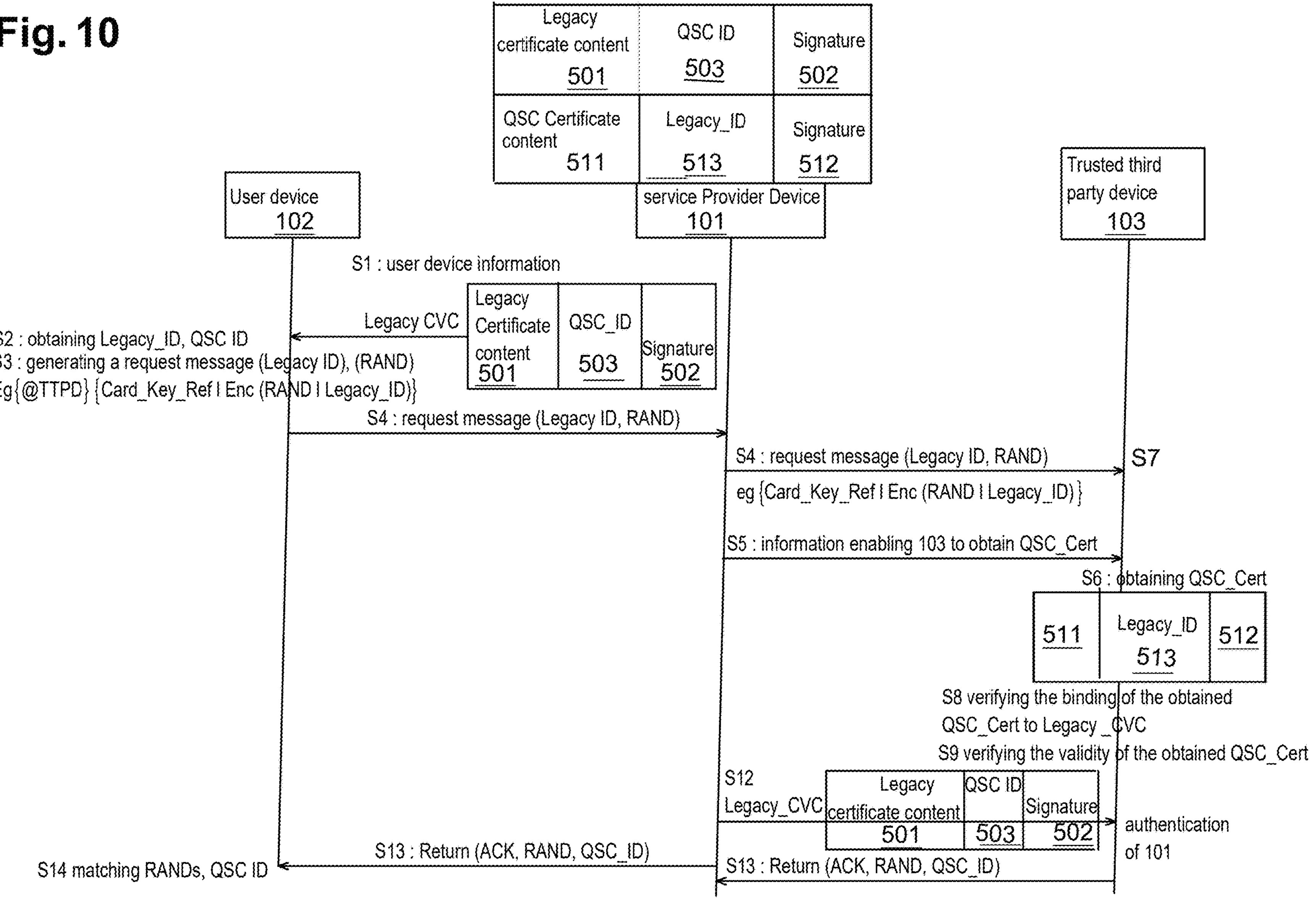
Fig. 10
Legacy certificate content 501
QSC ID 503
Signature 502
QSC Certificate content 511
Legacy_ID 513
Signature 512
User device 102
service Provider Device 101
Trusted third party device 103
S1 : user device information
Legacy CVC
Legacy Certificate content 501
QSC_ID 503
Signature 502
S2 : obtaining Legacy_ID, QSC ID
S3 : generating a request message (Legacy ID), (RAND)
Eg{@TTPD} {Card_Key_Ref I Enc (RAND I Legacy_ID)}
S4 : request message (Legacy ID, RAND)
S4 : request message (Legacy ID, RAND)
S7
eg {Card_Key_Ref I Enc (RAND I Legacy_ID)}
S5 : information enabling 103 to obtain QSC_Cert
S6 : obtaining QSC_Cert
511
Legacy_ID 513
512
S8 verifying the binding of the obtained QSC_Cert to Legacy _CVC
S9 verifying the validity of the obtained QSC_Cert
S12 Legacy_CVC
Legacy certificate content 501
QSC ID 503
Signature 502
authentication of 101
S13 : Return (ACK, RAND, QSC_ID)
S13 : Return (ACK, RAND, QSC_ID)
S14 matching RANDs, QSC ID

METHOD FOR AUTHENTICATION OF A SERVICE PROVIDER DEVICE TO A USER DEVICE

FIELD

The present invention relates to the field of post-quantum cryptography, and more particularly to a post-quantum method for authentication of a service provider device to a user device.

BACKGROUND

The increasing computational power of quantum computers is a growing threat to the security of classical signature schemes such as RSA or ECDSA. Such signature schemes will eventuality be defenseless against attacks performed using quantum computers. Therefore, certificates based on such legacy cryptography will not be reliable anymore. Using a quantum computer, an attacker would be able to discover the private key used to sign such certificates, which would enable him to issue fraudulent valid certificates.

Such certificates are used in interactions between service provider devices, such as terminals or servers, and user devices for authentication of a service provider device to a user device before any data exchange between the devices. For example, a terminal of a border authority must authenticate to the secure chip of an eMRTD such as a passport before being allowed to access the identity information stored in this chip. Or a web server must authenticate to a user computer or smartphone running a web browser or an application connecting to the server before personal data is sent to the server. An attacker able to issue fraudulent valid certificates would gain access to sensitive data stored in such a user device and then could re-use it for malicious purposes. For example, he could forge an electronic identity document and steal the user's identity, use biometric data of the user to access restricted area or use user devices protected by biometric authentication . . . .

In order to prevent attacks using quantum computers, quantum-safe cryptographic (QSC) protocols have been designed. Such protocols can be used to protect legacy certificates. For example, the ISO SC17 WG4 group in charge of future evolutions of smartcards investigates an approach in which an hybrid certificate is produced by over-signing a legacy certificate using a QSC protocol.

Solutions based on such hybrid certificates have the first major drawback of greatly increasing the size of the certificate. For example legacy certificates compliant to TR 03110 v2.10 part 1 have an average size less than 1.2 kB. Associated hybrid certificate would have a size up to 5.2 kB for NIST security level 2 and up to 6.2 kB for NIST security level 3, with CRYSTALS-DILITHIUM based signature. Such a size increase induces longer transmission and memory usage, which may be critical for user devices with limited available resources.

Such solutions also have a second major drawback of increasing processing time and associated power consumption of certificate verification processes.

Finally, they require user devices performing certificate verification to support both legacy and QSC cryptographic protocols.

Consequently, there is a need for a post-quantum authentication method and associated certificates with lower memory usage, processing times and power consumption than existing solutions based on hybrid certificates.

SUMMARY

For this purpose and according to a first aspect, this invention therefore relates to a method for post-quantum resistant authentication of a service provider device to a user device, using a legacy certificate of said service provider device and a quantum safe cryptography certificate of said service provider device, wherein:

said legacy certificate is based on a legacy cryptographic protocol, and said QSC certificate is based on a QSC cryptographic protocol and comprises an identifier of the legacy certificate, said identifier of the legacy certificate being obtainable from said legacy certificate, and comprising:

- verifying by a trusted third party device, using said identifier of the legacy certificate comprised in the QSC certificate, a binding of said QSC certificate to the legacy certificate of the service provider device,
- verifying a validity of said QSC certificate by said trusted third party device,
- when said binding and validity have been successfully verified by the trusted third party device, authentication of the service provider device to said user device using said legacy certificate of the service provider device from which can be obtained said identifier comprised in the QSC certificate whose validity has been verified.

Such a method enables the user device to verify that the service provider device has a valid QSC certificate before completing its authentication, while minimizing the amount of calculations to be performed by the user device itself. It also does not require the user device to be able of running QSC cryptographic protocols.

Said legacy cryptographic protocol may be among RSA protocol, ECC (Elliptic-Curve Cryptographic) protocol.

Said QSC cryptographic protocol may be among hash-based, lattices-based and multivariate-based cryptographic protocol.

In a first embodiment, said legacy certificate comprises a legacy certificate content and said identifier of the legacy certificate is a hash of the legacy certificate content.

Using such an identifier enables to bind the two certificates without modifying the content of the legacy certificate of the service provider device, which enables it to keep using its existing legacy certificate.

In a second embodiment, said legacy certificate comprises a legacy certificate content and said identifier of the legacy certificate is comprised in said legacy certificate content.

It enables the user device to get the knowledge of the identifier of the legacy certificate of the service provider device without additional computation.

The method according to the first aspect may comprise, performed by said user device:

- obtaining said identifier of the legacy certificate from information transmitted by said service provider device to be authenticated,
- securely transmitting to said trusted third party device said obtained identifier of the legacy certificate, such that said trusted third party device uses said transmitted identifier of the legacy certificate and said identifier of the legacy certificate comprised in the QSC certificate to verify a binding of said QSC certificate to the legacy certificate of the service provider device.

It enables the user device to specify to the trusted third party device for which service provider device, and associated legacy certificate, it asks for a verification that the service provider device has a valid QSC certificate.

Moreover, the method according to the first aspect may comprise, performed by said user device:

receiving from said trusted third party device an acknowledgment message indicating a successful verification by the trusted third party device of:

- the binding of said QSC certificate to the legacy certificate of the service provider device, and
- the validity of said QSC certificate, wherein said authentication of the service provider device to said user device using said legacy certificate of the service provider device is performed by said user device and triggered by the reception of said acknowledgment message.

Performed by said service provider device, the method according to the first aspect may comprise:

- sending to said user device information from which said user device obtains said identifier of the legacy certificate,
- sending to said trusted third party device information enabling the trusted third party device to obtain said QSC certificate.

Performed by said trusted third party device, the method according to the first aspect may comprise:

- obtaining said QSC certificate,
- receiving from said user device an identifier of the legacy certificate, wherein verifying a binding of said obtained QSC certificate to the legacy certificate of the service provider device, comprises matching said received identifier of the legacy certificate with said identifier of the legacy certificate comprised in the obtained QSC certificate, and wherein verifying a validity of said QSC certificate comprises verifying a validity date and a revocation status of said obtained QSC certificate.

In a first embodiment, the method according to the first aspect may comprise performed by said trusted third party device, sending to said user device an acknowledgment message indicating a successful verification by the trusted third party device of:

- the binding of said QSC certificate to the legacy certificate of the service provider device, and
- the validity of said QSC certificate.

In a second embodiment, said authentication of the service provider device to said user device may comprise, performed by said trusted third party device:

- authenticating said service provider device using said legacy certificate of the service provider device when said verification by the trusted third party device of the binding of said QSC certificate to the legacy certificate of the service provider device, and of the validity of said QSC certificate is successful,
- securely sending to said user device an acknowledgment message indicating a successful authentication of the service provider device.

It enables to further decrease the amount of operations to be performed by the user device by delegating the verification of the legacy certificate of the service provider device to the trusted third party device.

According to a second aspect, this invention therefore relates also to a computer program product directly loadable into the memory of at least one computer, comprising software code instructions for performing the steps of the method according to the first aspect when said product is run on the computer.

According to a third aspect, this invention therefore relates also to a user device comprising a processor and an input-output interface configured for performing the steps of the method according to the first aspect.

According to a fourth aspect, this invention therefore relates also to a service provider device comprising a processor and an input-output interface configured for performing the steps of the method according to the first aspect.

According to a fifth aspect, this invention therefore relates also to a trusted third party comprising a processor and an input-output interface configured for performing the steps of the method according to the first aspect.

According to a sixth aspect, this invention therefore relates also to a system comprising a user device, a service provider device and a trusted third party device configured for performing the steps of the method according to the first aspect.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

FIGS. 6 and 7 illustrate schematically methods for post-quantum resistant authentication of a service provider device to a user device using the format of legacy and QSC certificates illustrated on FIG. 5 according to embodiments of the present invention;

FIGS. 9 and 10 illustrate schematically methods for post-quantum resistant authentication of a service provider device to a user device using the format of legacy and QSC certificates illustrated on FIG. 8 according to embodiments of the present invention.

DETAILED DESCRIPTION

Figure 1:
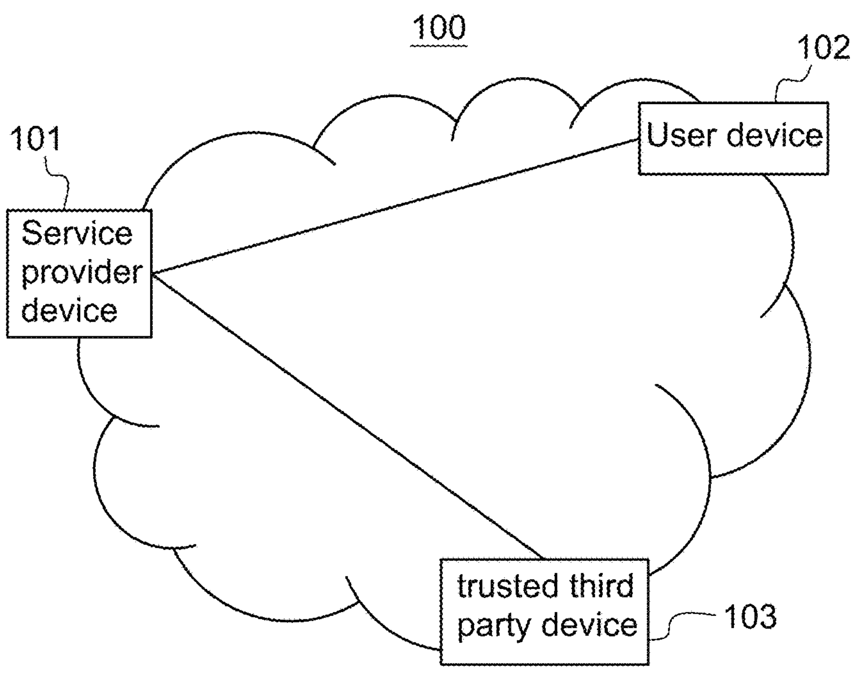
FIG. 1 is a schematic illustration of a system according to an embodiment of the present invention.

The invention relates to methods, systems 100 and associated devices, for a post-quantum authentication of a service provider device 101 to a user device 102, the service provider device having a legacy certificate Legacy_CVC as shown on FIG. 1.

Figure 2:
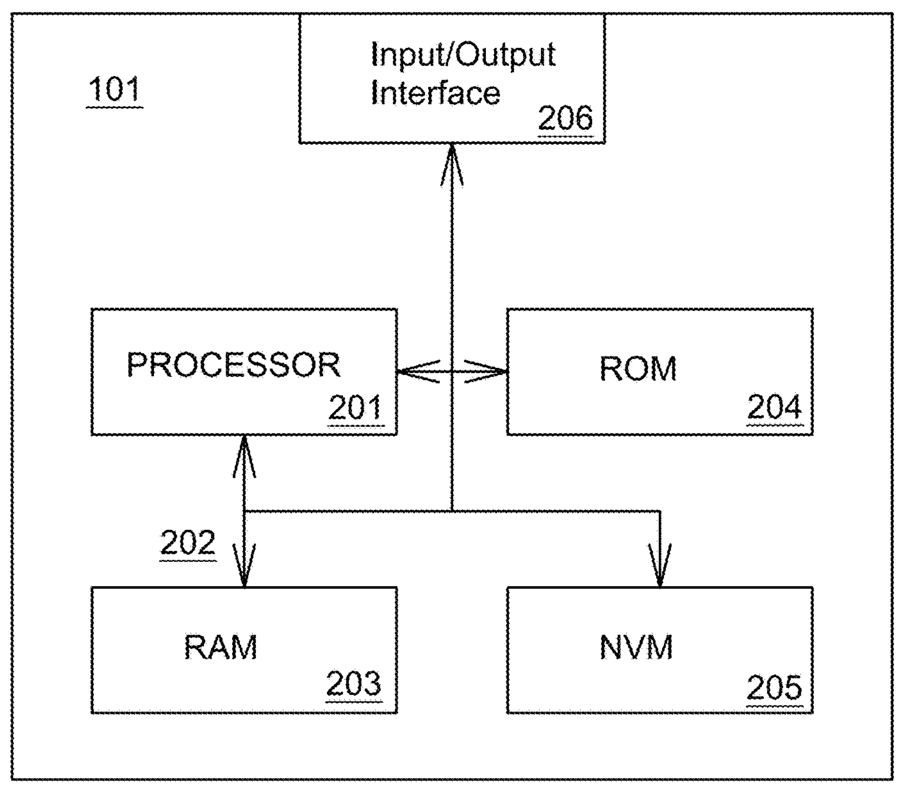
FIG. 2 is a schematic illustration of a service provider device according to an embodiment of the present invention.

As shown on FIG. 2, such a service provider device 101 may include a processor 201 connected via a bus 202 to a random access memory (RAM) 203, a read-only memory (ROM) 204, and/or a non-volatile memory (NVM) 205 and an input/output interface 206.

Figure 3:
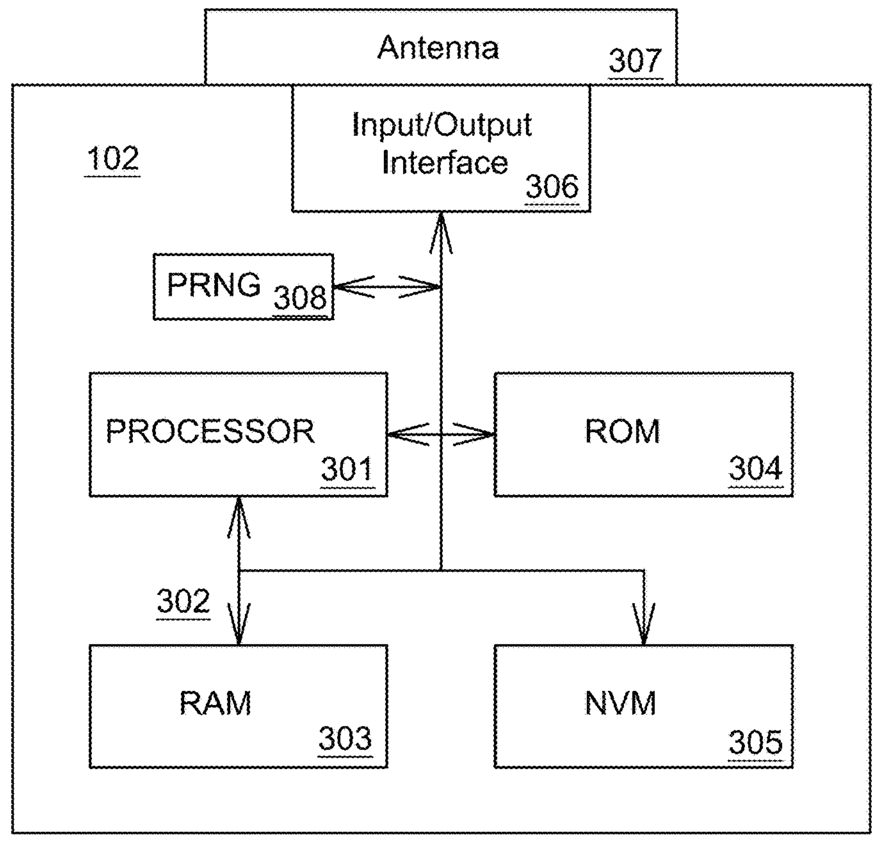
FIG. 3 is a schematic illustration of a user device according to an embodiment of the present invention.

As shown on FIG. 3, such a user device 102 may include a processor 301 connected via a bus 302 to a random access memory (RAM) 303, a read-only memory (ROM) 304, and/or a non-volatile memory (NVM) 305 and an input/output interface 306.

As shown on the system 100 of the FIG. 1, the service provider device 101 and the user device 102 are connected by a first communication link. Such a communication link may be a wired communication link. In such a case the input/output interface 306 may be an ISO 7816 interface. Alternatively, such a communication link may be a wireless communication link. In such a case, the input/output interface 306 may be a short range communication interface such as NFC, or a longer range communication interface such as 3G, 4G or 5G broadband communication cellular network communication interfaces. In such a case, the user device may further include an antenna 307 connected to the input/output interface. The user device may also be embedded into a host device comprising a wireless communication interface, such as a mobile phone, and the first communication link between the user device and the service provider device may be set through the communication interface of the host device.

The user device may also comprise a pseudo random number generator (PRNG) 308 for generating random numbers to be used in cryptographic operations.

The user device may be a user digital device such as a computer or a smartphone. It may also be a secure device such as a stand alone smartcard, or an embedded secure element eSE or integrated secure element iSE embedded/integrated in such a user digital device. Such a user device may run software, including secure software such as software protected against whitebox attacks. As an example, the service provider device 101 may be a border authority terminal and the user device 102 may be an eMRTD such as a passport authenticating the terminal before allowing it to access the identity information stored in the chip of the eMRTD. Similarly, the user device may be a national electronic identity document eID and the service provider device may be a government identity verification terminal. As another example, the user device may be an embedded UICC and the service provider device may be a payment terminal authenticating to the eUICC before performing a NFC transaction. Alternatively, the user device may be an electronic health card, such as eEHIC, and the service provider device may be a healthcare practitioner terminal authenticating to the user device for accessing healthcare data of the user. As a last example, the user device may be a user computer or smartphone running a web browser or an application and the service provider device may be a web server to which the web browser or application connects and which must authenticate to the user device before the user device sends personal data, such as banking information or account credentials, to the web server.

As shown on FIG. 1, the service provider device 101 is also connected to a trusted third party device 103 by a second communication link.

The main idea of the invention for making an authentication process of the service provider device resistant to post-quantum attacks is to bind the legacy certificate of the service provider device Legacy_CVC to a quantum QSC certificate QSC_Cert of the service provider device and to make the trusted third party verify the validity of this QSC certificate before the validity of the legacy certificate is verified.

Figure 4:
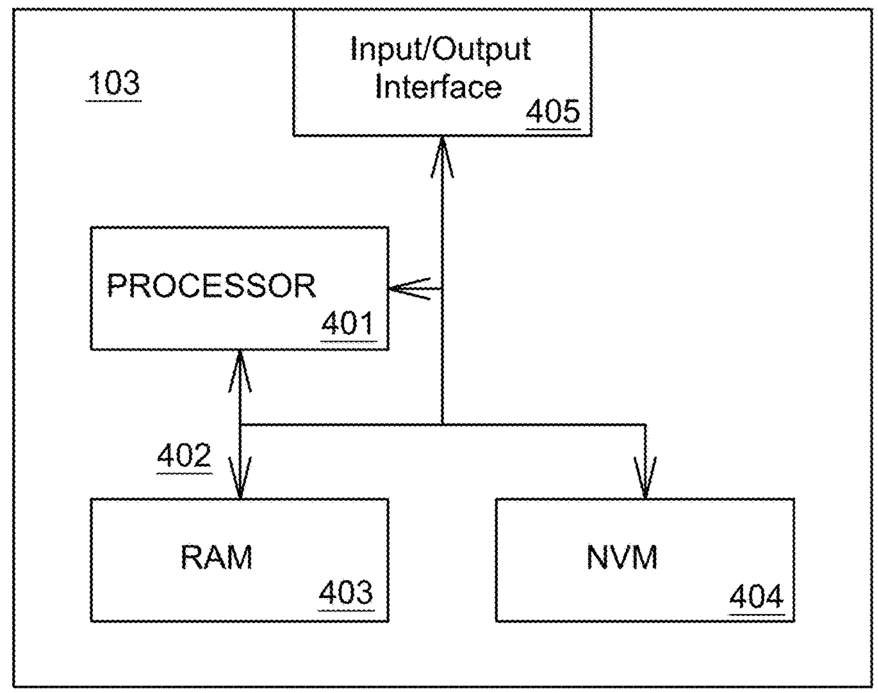
FIG. 4 is a schematic illustration of a trusted third party device according to an embodiment of the present invention.

As shown on FIG. 4, such a trusted third party device 103 may comprise a processor 401 connected via a bus 402 to a random access memory (RAM) 403, and a non-volatile memory (NVM) 404 storing a database in which data needed for the authentication process of the service provider device may be stored. It may further comprise a communication interface 405 by which the trusted third party device is connected to the service provider device. For example, the trusted third party device may be connected to the service provider device via the Internet through an Ethernet interface.

Such a third party device may for example be a server of a QSC-based PKI Management service.

The trusted third party device and the user device shall communicate with each other in the course of the authentication process of the service provider device according the invention. When the user device only comprises communication means enabling a connection to the service provider device, such as an ISO7816 interface or a short-range communication interface, no direct connection between the user device and the trusted third party device exist, and all communications between them are transferred through the service provider device. Alternatively, when the user device is connected to the Internet, for example via the communication means of a host device, a direct connection, independent of the service provider device, may be established between the user device and the trusted third party device.

Figure 5:
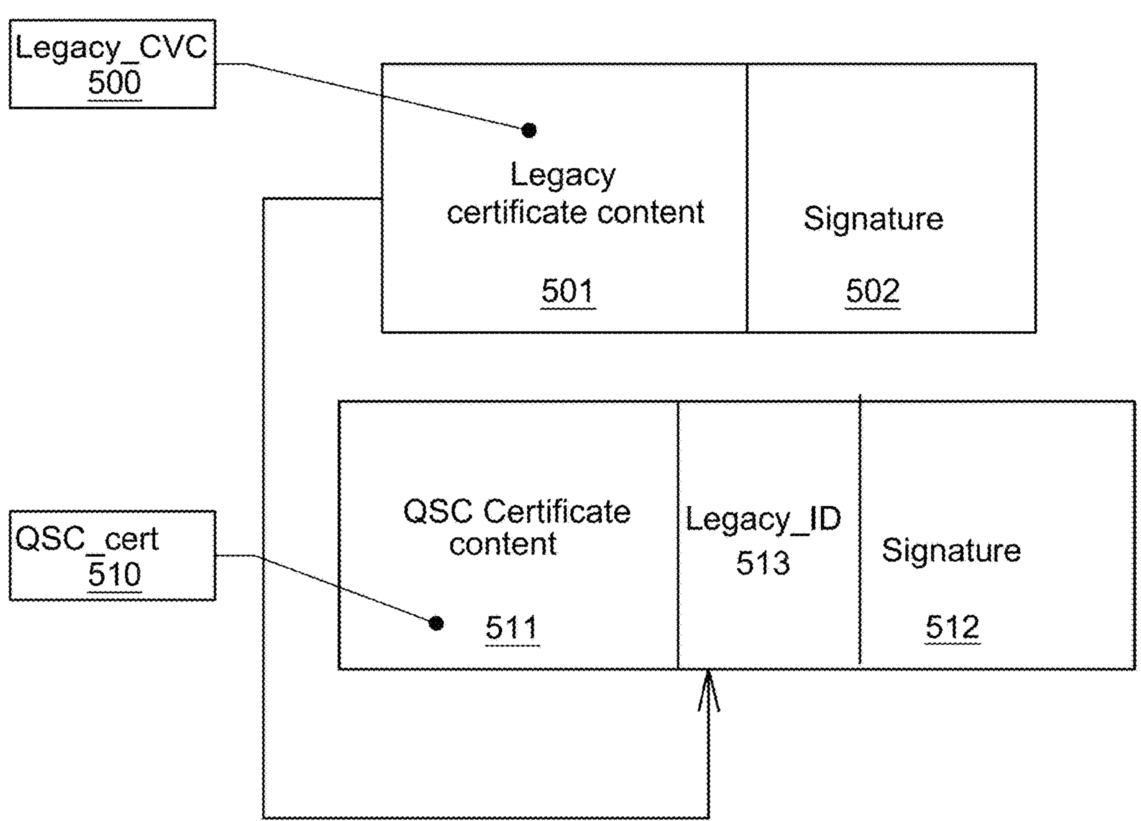
FIG. 5 is a schematic illustration of the format of legacy and QSC certificates used according to a first embodiment of the present invention.

The format of the legacy certificate Legacy_CVC and the QSC certificate QSC_cert of the service provider device are shown on FIG. 5.

The legacy certificate Legacy CVC 500 comprises a legacy certificate content 501. The legacy certificate content may for example comprise an identifier of the certificate issuer, an identifier of the service provider device, its public key, its authorizations, an expiry date. The legacy certificate Legacy_CVC 500 also comprises a signature 502 of the legacy certificate content generated by an issuer of the certificate using its private key and a legacy cryptographic protocol. Such a legacy cryptographic protocol may for example be RSA protocol such as RSA PKCS #1 v1.5 or RSA-PSS of PKCS #1 v2 or an ECC protocol such as ECDSA.

The QSC certificate QSC_cert 510 comprises a QSC certificate content 511. It may for example be a self-descriptive or non-self-descriptive certificate, a X.509 certificate or a X.509v3 certificate. The QSC certificate content may comprise the same kind of elements that the Legacy CVC content. It may also comprise additional elements such as an identifier of the cryptographic algorithm used to sign it. The QSC certificate may comprise authorizations of the service provider device which override the authorizations described in the Legacy CVC certificate of the same device. The QSC certificate 510 also comprises a signature 512 of the QSC certificate content generated by an issuer of the certificate using its private key and a QSC cryptographic protocol. Such a QSC cryptographic protocol may for example be a hash-based protocol such as LMS or XMSS, a lattices-based protocol such as Crystals-dilithium, Falcon, PicNic or SPHINCS+, or a Multivariate-based protocol such as Rainbow or GeMSS.

In order to bind the legacy certificate Legacy_CVC of the service provider device and the QSC certificate QSC_cert of the service provider device, the QSC certificate QSC_cert comprises an identifier of the legacy certificate Legacy_ID 513. This identifier of the legacy certificate shall be a reference value, unique to the legacy certificate Legacy CVC, such as a Universally Unique Identifier (UUID), an Object Identifier (OID), a Uniform Resource Identifier (URI) or a Decentralized Identifier (DID), and shall be obtainable from the legacy certificate Legacy_CVC:

in a first embodiment, the identifier Legacy_ID is a hash of the legacy certificate content 501. It may be obtained from the legacy certificate by applying a predetermined hash function to the legacy certificate content, such as MD5, SHA1, SHA2, SHA3 or SHAKE.

in a second embodiment, the identifier Legacy_ID is a value that is also comprised in the legacy certificate Legacy CVC, for example in its legacy certificate content. As an example, it can be a serial number such as the one included in X509 certificates. In such a case, it may be obtained from the legacy certificate by just reading it in the legacy certificate Legacy CVC. In such an embodiment, the identifier, in addition to being a reference value, may have another use. For example when it is a DID, it may be a pointer, for example to a blockchain address, enabling to retrieve additional data such as authorizations or information about the PKI managing the certificate.

In order to make post-quantum resistant the service provider device authentication to the user device, the user device shall be able to verify that the service provider device has both a valid legacy certificate and a valid QSC certificate. In order to do while minimizing the amount of calculation to be performed by the user device, according to the invention, the user device shall delegate to the third party device:

the verification, using the identifier of the legacy certificate Legacy_ID comprised in the QSC certificate QSC_Cert, of the binding of the QSC certificate QSC_Cert to the legacy certificate Legacy_CVC of the service provider device;

the verification of the validity of the QSC certificate QSC_Cert of the service provider device.

When said binding and validity have been successfully verified by the trusted third party device, the authentication of the service provider device to the user device can be completed using the legacy certificate of the service provider device Legacy_CVC bound to the validated QSC_cert; that is to say using the legacy certificate 500 from which can be obtained the identifier comprised in the QSC certificate 510 whose validity has been verified.

In this application, the expression "verifying the validity" of a certificate is used to describe the verification of the validity of the signature included in the certificate, the verification of a validity date of the certificate proving that the certificate has not expired, and the verification of the revocation status of the certificate. Since a QSC certificate of a device may comprise authorizations overriding the authorizations specified in the legacy certificate of the same device, "verifying the validity" may also include verifying whether authorizations specified in the certificate being verified override/are overridden by a different certificate for the same device.

Binding the two certificates by including in the QSC certificate of the service provider device an identifier of the legacy certificate of the service provider device enables to use the authentication method of the invention with existing legacy certificates of service provider devices, without requiring the emission of adapted legacy certificates.

In addition to this verification of the certificates binding and of the validity of the QSC certificate, the trusted third party device may also inform the user device of any change in the role of the legacy certificate of the service provider device in case it is enhanced or restricted by the QSC certificate of the service provider device.

The following paragraphs describe with more details the steps of the methods of the invention as described in FIG. 6.

In a first authentication step S1, the service provider device initiates its authentication to the user device by sending to the user device information from which the user device can obtain the identifier of the legacy certificate Legacy_ID of the service provider device.

In a second authentication step S2, the user device obtains the identifier of the legacy certificate Legacy_ID of the service provider device from the information transmitted by the service provider device. In a first embodiment depicted on FIG. 6, the service provider device has transmitted its legacy certificate Legacy_CVC to the user device. In such a case, the user device can either read the identifier in the legacy certificate, or compute it from the legacy certificate content, depending on the nature of the identifier, as described above. In a second embodiment, the service provider device has only transmitted to the user device the identifier Legacy_ID of its legacy certificate, making the user device directly aware of its value without any additional operation.

In a first request step S3, the user device generates a request message comprising the obtained identifier of the legacy certificate Legacy_ID.

In a second request step S4, the user device securely transmits to the trusted third party device the generated request message including the obtained identifier of the legacy certificate Legacy_ID. When the user device has communication means enabling it, it can directly transmit the generated request message to the trusted third party device. In such a case, it also sends to the service provider device a message warning it of the transmission of the request message to the trusted third party device and specifying an address of the trusted third party device. Alternatively, the user device may transmit the request message to the service provider device such that the service provider device may forward it to the trusted third party device. In such a case, the user device may include in the request message the address @TTPD of the trusted third party device.

In order to ensure the secure transmission of the request message to the trusted third party device, the user device may encrypt the identifier of the legacy certificate of the service provider device, using a secret key Card_Key, as shown on FIG. 6. It enables to prevent any fraudulent alteration of the request message, for example by the service provider device, before the trusted third party device receives it. In order to enable the trusted third party device to decipher the encrypted part of the request message, the user device may have previously shared its secret key with the trusted third party device and it may include in the request message an identifier Card_Key_Ref of the secret key used for encrypting the identifier in the request message.

As shown on FIG. 6 when such an encryption is performed and the address of the trusted third party device is included in the request message, the request message may for example be equal to {@TTPD} {Card_Key_Ref|Enc (RAND|Legacy_ID)}, where {@TTPD} is the endpoint to which the message is directed, that is to say the trusted third party device. RAND is a random value, the use of which is described below.

In a third request step S5, the service provider device sends to the trusted third party device information enabling the trusted third party device to obtain the QSC certificate QSC_Cert of the service provider device. When the user device has transmitted its request message to the service provider device, the service provider device also forwards this request message to the trusted third party device.

In this step, the service provider device may send its QSC certificate itself to the trusted third party device. Alternatively, the QSC certificate of the service provider device may be stored in the database hosted by the trusted third party device and the service provider device may send to the service provider device a reference enabling the trusted third party device to extract the QSC certificate of the service provider device from its database.

In a first QSC authentication step S6, the trusted third party device obtains the QSC certificate QSC_cert of the service provider device. As described above, it may either receive it from the service provider device or retrieve it, for example from its database, based on a reference transmitted by the service provider device.

In a second QSC authentication step S7, the trusted third party device receives from the user device its request message including an identifier of the legacy certificate Legacy_ID of the service provider device. As described above in the second request step S4, the trusted third party device may either receive it directly from the user device or from the service provider device forwarding it. When the user device has encrypted a part of the request message, the trusted third party device may read in the request message the identifier of the secret key of the user device used for encrypting the identifier of the legacy certificate Legacy_ID of the service provider device in the request message, use this identifier to retrieve the secret key, and decipher the encrypted part of the request message.

In a third QSC authentication step S8, the trusted third party device verifies the binding of the QSC certificate QSC_Cert of the service provider device, obtained at the first QSC authentication step S6, to the legacy certificate Legacy_CVC owned by the service provider device. In order to do so, it verifies a matching between the identifier of the legacy certificate of the service provider device received in the request message from the user device and the identifier of the legacy certificate comprised in the obtained QSC certificate QSC_Cert. Thus, the trusted third party device checks if the QSC certificate obtained by the third party device is indeed bound to the legacy certificate transmitted by the service provider device to the user device, or bound to the legacy certificate that the service provider device claims to possess when in the first authentication step S1 the service provider device has only transmitted the identifier of its legacy certificate to the user device.

Such a verification prevents the service provider device from using the QSC certificate of another service provider device, which would not be bound to its legacy certificate.

In a fourth QSC authentication step S9, the trusted third party device verifies the validity of the QSC certificate QSC_Cert obtained from the service provider device at the first QSC authentication step S6. It may include verifying a validity date and a revocation status of the certificate. In order to do so, the trusted third party device shall obtain the public key of the certification authority that signed the QSC certificate of the service provider device.

Depending on the structure of the Public Key Infrastructure issuing the QSC certificates, the verification of several chained QSC certificates may be required. For example, in the case of eMRTD documents, the QSC certificate of the service provider device may have been issued by a Document Verifier (DV), whose public key is provided in a DV QSC certificate signed by a Country Verifying Certification Authority (CVCA), whose public key is available in a CVCA certificate.

In order to verify the validity of the QSC certificate transmitted by the service provider device, the trusted third party device shall in addition obtain the QSC certificates of all the certification authorities in the certificate chain. For example, the certificates of the DV and the CVCA. Each of these certificates may either be provided by the service provider device, or stored by the trusted third party device in a database and retrieved when needed, or downloaded from an external certificate repository. When the service provider device does not provide the certificate of the certification authority at the start of the certificate chain, the service provider device shall indicate to the trusted third party device the identity of this certification authority in order to enable the trusted third party device to retrieve its certificate. As an example, a certification authority reference may be comprised in the QSC certificate transmitted by the service provider device to the trusted third party device.

After the trusted third party has successfully verified, at the third and fourth QSC authentication steps S8 and S9, the binding of the QSC certificate QSC_Cert transmitted by the service provider device to the legacy certificate Legacy_CVC of the service provider device, and the validity of this QSC certificate, the authentication of the service provider device may be completed by verifying the validity of the legacy certificate Legacy_CVC of the service provider device to which the verified QSC certificate is bound. Such a verification may either be performed by the user device or by the trusted third party device.

In a first embodiment, the verification is performed by the user device. In that case, as described on FIG. 6, in a first acknowledgment step S10, the trusted third party device sends to the user device an acknowledgment message ACK indicating the success of the verifications performed at the third and fourth QSC authentication steps S8 and S9. Such an acknowledgment message may specify access rights, defined in the QSC certificate, to resources of the user device to be provided to the service provider device following its successful authentication. As described above regarding other communications between the trusted third party device and the user device, this acknowledgment message may, if needed, be sent to the service provider device and forwarded by the service provider device to the user device, as depicted on FIG. 6. The acknowledgment message ACK may also comprise a session transcript, in order to bind the answer to the session and avoid replay attacks.

When the user device encrypted part of its request message at the second request step S4 and the user device and the trusted third party device share a secret key of the user device, the trusted third party device may encrypt its acknowledgment message using the secret key of the user device, before transmitting it.

Then in a first legacy authentication step S11, the user device receives the acknowledgment message sent by the trusted third party device, deciphers it if it had been ciphered by the trusted third party device, and completes the authentication of the service provider device using its legacy certificate Legacy_CVC. In case the service provider device only transmitted to the user device at the first authentication step S1 an identifier of its legacy certificate, and not its legacy certificate itself, this legacy authentication step S11 includes:

- a transmission to the user device by the service provider device of its legacy certificate Legacy_CVC,
- a determination by the user device of an identifier of the transmitted legacy certificate, and
- a comparison by the user device of the identifier it determined with the identifier transmitted by the service provider device at the first authentication step S1.

By doing so, the user devices makes sure that the legacy certificate transmitted by the service provider device is indeed the one to which is bound the QSC certificate validated by the trusted third party device.

In a second embodiment illustrated on FIG. 7, the verification is performed by the trusted third party device. In that case, in a second legacy authentication step S12, the trusted third party device receives from the service provider device its legacy certificate Legacy_CVC, determines an identifier of the transmitted legacy certificate, compares it with the identifier transmitted by the user device in its request message at the second request step S4, and completes the authentication of the service provider device using the received legacy certificate.

Then, in a second acknowledgment step S13, the trusted third party device sends to the user device an acknowledgment message ACK indicating a successful authentication of the service provider device. As described above, this acknowledgment may, if needed, be sent to the service provider device and forwarded by the service provider device to the user device, and may be encrypted using the secret key of the user device. Such an acknowledgment message may specify access rights to resources of the user device provided to the service provider device following its successful authentication. The acknowledgment message ACK may also comprise a session transcript, in order to bind the answer to the session and avoid replay attacks.

In order to make sure that the acknowledgment it receives at the first or second acknowledgment steps S10 or S13 is sent in response to its request message sent at the second request step S4, the user device may at the first request step S3, generate a random value RAND, using its pseudo random number generator, encrypt it using its shared secret key and append it to the request message, as shown on FIGS. 6 and 7. Then, at the first or second acknowledgment steps S10 or S13, the trusted third party device may include this random value RAND in its acknowledgment message; and at the first legacy authentication step S11 when the verification of the legacy certificate of the service provider device is performed by the user device as shown on FIG. 6, or at a third legacy authentication step S14 after the second acknowledgment step S13 when the verification of the legacy certificate of the service provider device is performed by the trusted third party device as shown on FIG. 7, the user device may compare the random value in the received acknowledgment message to the random value it inserted in the request message.

Figure 8:
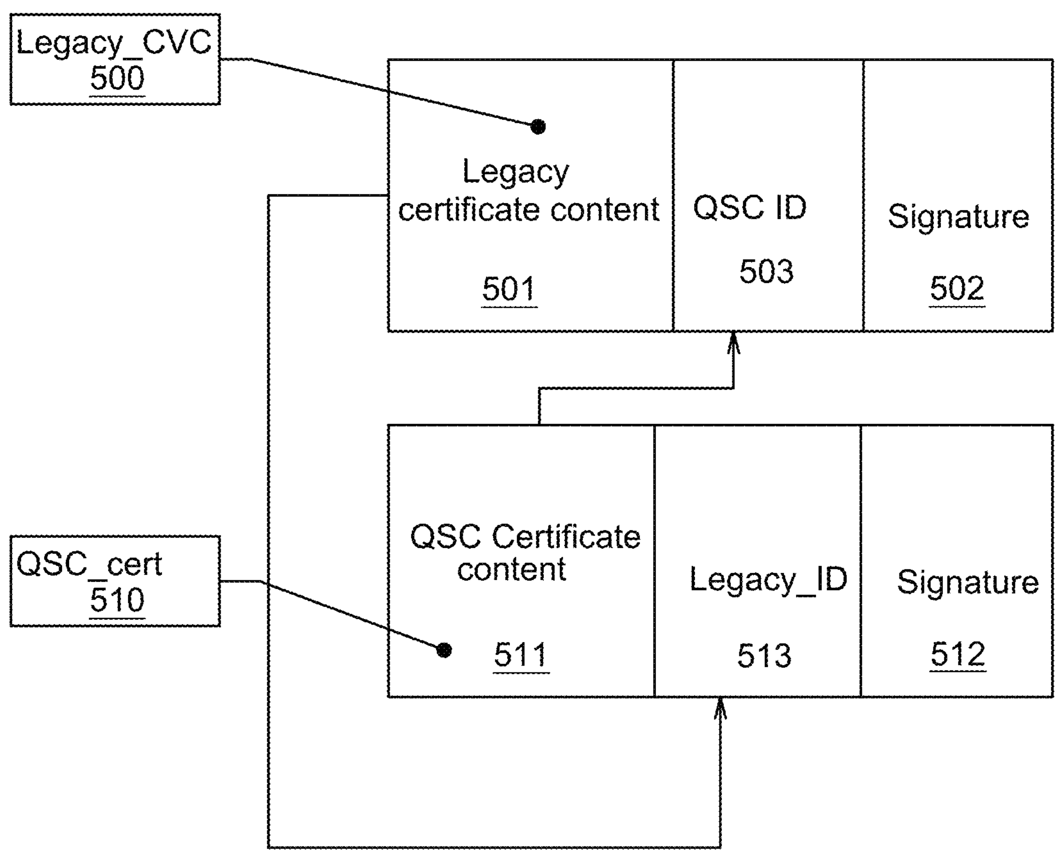
FIG. 8 is a schematic illustration of the format of legacy and QSC certificates used according to a second embodiment of the present invention.

As shown on FIG. 8, the bound between the legacy certificate Legacy_CVC of the service provider device and the QSC certificate QSC_cert of the service provider device may be further strengthened by including in the legacy certificate Legacy_CVC an identifier of the QSC_certificate 503. This identifier of the QSC certificate shall be obtainable from the QSC certificate QSC_cert. As for the identifier of the legacy certificate, this identifier of the QSC certificate may either be a hash of the QSC certificate content 511, or a reference value included as well in the QSC certificate of the service provider device.

In such a case, as shown on FIG. 9 in case the verification of the legacy certificate is performed by the user device, at the second authentication step S2 the user device also obtains the identifier of the QSC certificate of the service provider device. In the embodiment depicted on FIG. 9, in which the service provider device has transmitted its legacy certificate Legacy_CVC to the user device at the first authentication step S1, the user device may read the identifier of the QSC certificate in the legacy certificate transmitted by the service provider device. In the embodiment in which the service provider device did not transmit its legacy certificate at the first authentication step S1 but only the identifier Legacy_ID of its legacy certificate, the service provider device shall also transmit during that first authentication step S1 the identifier of its QSC certificate.

Then, at the first acknowledgment step S10 as depicted on FIG. 9, or at the second acknowledgment step S13 as depicted on FIG. 10, the trusted third party device may obtain the identifier of the QSC certificate transmitted by the service provider device or the identifier of the QSC certificate whose reference has been transmitted by the service provider device at the third request step S5; and it may include the obtained identifier in the acknowledgement message it transmits to the user device.

Then, at the first legacy authentication step S11 before completing the authentication of the service provider device, as depicted on FIG. 9, or at the third legacy authentication step S14, as depicted on FIG. 10, the user device may compare the identifier of the QSC certificate it obtained at the second authentication step S2 with the identifier of the QSC certificate comprised in the acknowledgment message transmitted by the trusted third party device. When the service provider device, at the first authentication step S1 did not transmit its legacy certificate but only the identifiers of its legacy and QSC certificates, the first legacy authentication step S11 or the third legacy authentication step S14 also comprises:

- a transmission to the user device by the service provider device of its legacy certificate Legacy_CVC,
- a reading by the user device of the identifier of the QSC certificate of the service provider device comprised in the transmitted legacy certificate, and
- a comparison by the user device of the identifier it read with the identifier of the QSC certificate transmitted by the service provider device at the first authentication step S1.

Such an additional binding of the certificates of a service provider device, by including an identifier of the QSC certificate of a service provider device in its legacy certificate, requires the emission of new legacy certificates for the service provider devices. This can be seen as an advantage as it will discard previous certificates which could be malicious certificates emitted by an attacker owning the private key of certification authority.

In a world where some service provider device may have QSC certificates and some others may only have legacy certificates, such an additional binding also enables the user device to know from a service provider device's legacy certificate if this service provider device has a QSC certificate.

The first authentication step S1 may include a detection by the user device, based on information provided by the service provider device, whether the service provider device supports QSC certificate-based authentication or not. It may also include the enforcement by the user device of a QSC policy. For example:

- When a user device determines that a service provider device does not own a QSC certificate, it may interrupt the authentication of the service provider device and deny it access to part or all of its resources.
- When the user device determines that a service provider device trying to authenticate owns a QSC certificate and when at the same time the user device cannot communicate with the trusted third party device, for example because the user device and the service provider device are temporarily not connected to the Internet, the user device may authenticate the service provider device using its legacy certificate only and may restrain its access rights until it can get from the trusted third party device an acknowledgment of the validity of the QSC certificate of the service provider device. It may also reject any access request from the service provider.

Before the first execution of the steps described above, the method according to the invention may comprise enrollment step in which:

the user device or a user device manufacturer may register to the trusted third party device and provide it with its secret key Card_Key and the associated identifier Card_Key_Ref so that the trusted third party device is able to exchange encrypted messages with the user device. A user device manufacturer may share with the trusted third party device a master key from which the trusted third party device will be able to derive the secret keys of multiple user devices manufactured by this manufacturer.

certification authorities, such as CVCA and DV, and service provider devices may register to the trusted third party device and provide it with their QSC certificates, such that the trusted third party device may use it for future verifications of the validity of QSC certificates of service provider devices. Each certificate may be provided with a reference enabling the trusted third party authority to retrieve this certificate from its database when the corresponding reference is provided to the trusted third party.

The trusted third party device may store the information transmitted during this enrollment step in its database stored in its NVM 404.

According to a second aspect, the invention is also related to a computer program product directly loadable into the memory of at least one computer, comprising software code instructions for performing the steps of the method described above when said product is run on the computer.

According to a third aspect, this invention therefore relates also to a user device 102 comprising a processor 301 and an input-output interface 306 configured for performing the steps of the method described above.

According to a fourth aspect, this invention therefore relates also to a service provider device 101 comprising a processor 201 and an input-output interface 206 configured for performing the steps of the method described above.

According to a fifth aspect, this invention therefore relates also to a trusted third party 103 comprising a processor 401 and an input-output interface 405 configured for performing the steps of the method described above.

According to a sixth aspect, this invention therefore relates also to a system 100 comprising a user device 102, a service provider device 101 and a trusted third party device 103 configured for performing the steps of the method described above.

As a result, the binding of the certificates and delegating at least the verification of the QSC certificate of the service provider device to the trusted third party device enables the authentication of the service provider device to the user device to be quantum safe while minimizing the amount of computation to be performed by the user device and its memory usage.

The invention claimed is:

1. A method for post-quantum resistant authentication of a service provider device to a user device, using a legacy certificate of said service provider device and a quantum safe cryptography (QSC) certificate of said service provider device, wherein:

said legacy certificate (Legacy_CVC) is based on a legacy cryptographic protocol, and said quantum safe cryptography certificate (QSC_Cert) is based on a QSC cryptographic protocol and comprises an identifier of the legacy certificate (Legacy_ID), said identifier of the legacy certificate being obtainable from said legacy certificate, and comprising:

verifying by a trusted third party device, using said identifier of the legacy certificate (Legacy_ID) comprised in the QSC certificate (QSC_Cert), a binding of said QSC certificate (QSC_Cert) to the legacy certificate (Legacy_CVC) of the service provider device, verifying a validity of said QSC certificate (QSC_Cert) by said trusted third party device, when said binding and validity have been successfully verified by the trusted third party device, authentication of the service provider device to said user device, using said legacy certificate (Legacy_CVC) of the service provider device from which can be obtained said identifier comprised in the QSC certificate whose validity has been verified; and receiving from said trusted third party device an acknowledgment message indicating a successful verification by the trusted third party device;

wherein said authentication of the service provider device to said user device using said legacy certificate (Legacy_CVC) of the service provider device is performed by said user device and triggered by the reception of said acknowledgment message.

2. The method of claim 1, wherein said legacy cryptographic protocol is among RSA protocol, ECC protocol.

3. The method of claim 1, wherein said QSC cryptographic protocol is among hash-based, lattices-based and multivariate-based cryptographic protocol.

4. The method of claim 1, wherein said legacy certificate (Legacy_CVC) comprises a legacy certificate content and said identifier of the legacy certificate (Legacy_ID) is a hash of the legacy certificate content.

5. The method of claim 1, wherein said legacy certificate (Legacy_CVC) comprises a legacy certificate content and said identifier of the legacy certificate (Legacy_ID) is comprised in said legacy certificate content.

6. The method of claim 1 comprising, performed by said user device:

obtaining said identifier of the legacy certificate (Legacy_ID) from information transmitted by said service provider device to be authenticated, securely transmitting to said trusted third party device said obtained identifier of the legacy certificate (Legacy_ID), wherein said trusted third party device uses said transmitted identifier of the legacy certificate (Legacy_ID) and said identifier of the legacy certificate (Legacy_ID) comprised in the QSC certificate (QSC_Cert) to verify a binding of said QSC certificate (QSC_Cert) to the legacy certificate (Legacy_CVC) of the service provider device.

7. The method of claim 1 comprising, performed by said service provider device:

sending to said user device information from which said user device obtains said identifier of the legacy certificate (Legacy_ID), sending to said trusted third party device information enabling the trusted third party device to obtain said QSC certificate (QSC_Cert).

8. The method of claim 1 comprising, performed by said trusted third party device:

obtaining said QSC certificate (QSC_Cert), receiving from said user device an identifier of the legacy certificate (Legacy_ID), wherein verifying a binding of said obtained QSC certificate (QSC_Cert) to the legacy certificate (Legacy_CVC) of the service provider device, comprises matching said received identifier of the legacy certificate (Legacy_ID) with said identifier of the legacy certificate (Legacy_ID) comprised in the obtained QSC certificate (QSC_Cert), and wherein verifying a validity of said QSC certificate (QSC_Cert) comprises verifying a validity date and a revocation status of said obtained QSC certificate (QSC_Cert).

9. The method of claim 8 comprising performed by said trusted third party device, sending to said user device an acknowledgment message indicating a successful verification by the trusted third party device of:

the binding of said QSC certificate (QSC_Cert) to the legacy certificate (Legacy_CVC) of the service provider device, and the validity of said QSC certificate.

10. The method of claim 8 wherein said authentication of the service provider device to said user device comprises, performed by said trusted third party device:

authenticating said service provider device using said legacy certificate (Legacy_CVC) of the service provider device when said verification by the trusted third party device of the binding of said QSC certificate (QSC_Cert) to the legacy certificate (Legacy_CVC) of the service provider device, and of the validity of said QSC certificate is successful, securely sending to said user device an acknowledgment message indicating a successful authentication of the service provider device.

11. A computer program comprising a non-transitory computer-readable medium having stored thereon software code comprising instructions that, when executed by at least one processor, cause the at least one processor to perform a method for post-quantum resistant authentication of a service provider device to a user device, using a legacy certificate of said service provider device and a quantum safe cryptography (QSC) certificate of said service provider device, wherein:

said legacy certificate (Legacy_CVC) is based on a legacy cryptographic protocol, and said quantum safe cryptography certificate (QSC_Cert) is based on a QSC cryptographic protocol and comprises an identifier of the legacy certificate (Legacy_ID), said identifier of the legacy certificate being obtainable from said legacy certificate, and comprising:

verifying by a trusted third party device, using said identifier of the legacy certificate (Legacy_ID) comprised in the QSC certificate (QSC_Cert), a binding of said QSC certificate (QSC_Cert) to the legacy certificate (Legacy_CVC) of the service provider device, verifying a validity of said QSC certificate (QSC_Cert) by said trusted third party device, when said binding and validity have been successfully verified by the trusted third party device, authentication of the service provider device to said user device, using said legacy certificate (Legacy_CVC) of the service provider device from which can be obtained said identifier comprised in the QSC certificate whose validity has been verified; and receiving from said trusted third party device an acknowledgment message indicating a successful verification by the trusted third party device;

wherein said authentication of the service provider device to said user device using said legacy certificate (Legacy_CVC) of the service provider device is performed by said user device and triggered by the reception of said acknowledgment message.

12. A user device comprising a processor and an input-output interface configured for performing a method for post-quantum resistant authentication of a service provider device to a user device, using a legacy certificate of said service provider device and a quantum safe cryptography (QSC) certificate of said service provider device, wherein:

said legacy certificate (Legacy_CVC) is based on a legacy cryptographic protocol, and said quantum safe cryptography certificate (QSC_Cert) is based on a QSC cryptographic protocol and comprises an identifier of the legacy certificate (Legacy_ID), said identifier of the legacy certificate being obtainable from said legacy certificate, and comprising:

verifying by a trusted third party device, using said identifier of the legacy certificate (Legacy_ID) comprised in the QSC certificate (QSC_Cert), a binding of said QSC certificate (QSC_Cert) to the legacy certificate (Legacy_CVC) of the service provider device, verifying a validity of said QSC certificate (QSC_Cert) by said trusted third party device, when said binding and validity have been successfully verified by the trusted third party device, authentication of the service provider device to said user device, using said legacy certificate (Legacy_CVC) of the service provider device from which can be obtained said identifier comprised in the QSC certificate whose validity has been verified, and receiving from said trusted third party device an acknowledgment message indicating a successful verification by the trusted third party device;

wherein said authentication of the service provider device to said user device using said legacy certificate (Legacy_CVC) of the service provider device is performed by said user device and triggered by the reception of said acknowledgment message.

13. A service provider device comprising a processor and an input-output interface configured for performing a method for post-quantum resistant authentication of a service provider device to a user device, using a legacy certificate of said service provider device and a quantum safe cryptography (QSC) certificate of said service provider device, wherein:

said legacy certificate (Legacy_CVC) is based on a legacy cryptographic protocol, and said quantum safe cryptography certificate (QSC_Cert) is based on a QSC cryptographic protocol and comprises an identifier of the legacy certificate (Legacy_ID), said identifier of the legacy certificate being obtainable from said legacy certificate, and comprising:

verifying by a trusted third party device, using said identifier of the legacy certificate (Legacy_ID) comprised in the QSC certificate (QSC_Cert), a binding of said QSC certificate (QSC_Cert) to the legacy certificate (Legacy_CVC) of the service provider device, verifying a validity of said QSC certificate (QSC_Cert) by said trusted third party device, when said binding and validity have been successfully verified by the trusted third party device, authentication of the service provider device to said user device, using said legacy certificate (Legacy_CVC) of the service provider device from which can be obtained said identifier comprised in the QSC certificate whose validity has been verified, and receiving from said trusted third party device an acknowledgment message indicating a successful verification by the trusted third party device;

wherein said authentication of the service provider device to said user device using said legacy certificate) of the service provider device is performed by said user device and triggered by the reception of said acknowledgment message.

14. A trusted third party device comprising a processor and an input-output interface configured for performing a method for post-quantum resistant authentication of a service provider device to a user device, using a legacy certificate of said service provider device and a quantum safe cryptography (QSC) certificate of said service provider device, wherein:

said legacy certificate (Legacy_CVC) is based on a legacy cryptographic protocol, and said quantum safe cryptography certificate (QSC_Cert) is based on a QSC cryptographic protocol and comprises an identifier of the legacy certificate (Legacy_ID), said identifier of the legacy certificate being obtainable from said legacy certificate, and comprising:

verifying by a trusted third party device, using said identifier of the legacy certificate (Legacy_ID) comprised in the QSC certificate (QSC_Cert), a binding of said QSC certificate (QSC_Cert) to the legacy certificate (Legacy_CVC) of the service provider device, verifying a validity of said QSC certificate (QSC_Cert) by said trusted third party device, when said binding and validity have been successfully verified by the trusted third party device, authentication of the service provider device to said user device, using said legacy certificate (Legacy_CVC) of the service provider device from which can be obtained said identifier comprised in the QSC certificate whose validity has been verified, and receiving from said trusted third party device an acknowledgment message indicating a successful verification by the trusted third party device;

wherein said authentication of the service provider device to said user device using said legacy certificate (Legacy_CVC) of the service provider device is performed by said user device and triggered by the reception of said acknowledgment message.

15. A system comprising a user device, a service provider device and a trusted third party device configured for performing a method for post-quantum resistant authentication of a service provider device to a user device, using a legacy certificate of said service provider device and a quantum safe cryptography (QSC) certificate of said service provider device, wherein:

said legacy certificate (Legacy_CVC) is based on a legacy cryptographic protocol, and said quantum safe cryptography certificate (QSC_Cert) is based on a QSC cryptographic protocol and comprises an identifier of the legacy certificate (Legacy_ID), said identifier of the legacy certificate being obtainable from said legacy certificate, and comprising:

verifying by a trusted third party device, using said identifier of the legacy certificate (Legacy_ID) comprised in the QSC certificate (QSC_Cert), a binding of said QSC certificate (QSC_Cert) to the legacy certificate (Legacy_CVC) of the service provider device, verifying a validity of said QSC certificate (QSC_Cert) by said trusted third party device, when said binding and validity have been successfully verified by the trusted third party device, authentication of the service provider device to said user device, using said legacy certificate (Legacy_CVC) of the service provider device from which can be obtained said identifier comprised in the QSC certificate whose validity has been verified; and receiving from said trusted third party device an acknowledgment message indicating a successful verification by the trusted third party device;

wherein said authentication of the service provider device to said user device using said legacy certificate (Legacy_CVC) of the service provider device is performed by said user device and triggered by the reception of said acknowledgment message.

* * * * *